US008644858B2

(12) United States Patent
Nagai et al.

(10) Patent No.: US 8,644,858 B2
(45) Date of Patent: Feb. 4, 2014

(54) RADIO APPARATUS TRANSMITTING OR RECEIVING A SIGNAL INCLUDING PREDETERMINED INFORMATION

(75) Inventors: Makoto Nagai, Kakamigahara (JP); Noriaki Kojima, Ogaki (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 13/425,129

(22) Filed: Mar. 20, 2012

(65) Prior Publication Data

US 2012/0238296 A1 Sep. 20, 2012

Related U.S. Application Data

(63) Continuation of application No. PCT/JP2011/004331, filed on Jul. 29, 2011.

(30) Foreign Application Priority Data

Jul. 30, 2010 (JP) .................................. 2010-171668

(51) Int. Cl.
*H04W 24/00* (2009.01)

(52) U.S. Cl.
USPC ........................................ 455/456.6; 455/457

(58) Field of Classification Search
USPC ............... 455/456.1–457; 340/904, 938, 435, 340/531, 532, 539.1–539.3; 701/300, 301
See application file for complete search history.

(56) References Cited

U.S. PATENT DOCUMENTS

| 4,017,825 | A  | * | 4/1977  | Pichey .......................... 340/906 |
| 2001/0014616 | A1 | * | 8/2001  | Matsuda et al. ............... 455/567 |
| 2002/0198660 | A1 | * | 12/2002 | Lutter et al. ................... 701/301 |
| 2004/0049343 | A1 | * | 3/2004  | Yamadaji et al. ............. 701/301 |
| 2004/0249571 | A1 | * | 12/2004 | Blesener et al. .............. 701/301 |
| 2005/0197771 | A1 | * | 9/2005  | Seick et al. .................... 701/301 |
| 2006/0055525 | A1 | * | 3/2006  | Kubota et al. ................. 340/461 |
| 2006/0105778 | A1 | * | 5/2006  | Wiederspahn ............. 455/456.1 |
| 2006/0229812 | A1 | * | 10/2006 | Eckstein et al. .............. 701/300 |
| 2007/0276600 | A1 | * | 11/2007 | King et al. .................... 701/301 |

(Continued)

FOREIGN PATENT DOCUMENTS

| JP | 06-203293 A | 7/1994 |
| JP | 2002-152840 A | 5/2002 |

(Continued)

OTHER PUBLICATIONS

Japanese Notification of Reason(s) for Refusal, w/ English translation thereof, issue in Japanese Patent Application No. JP 2011-551350 dated Jul. 17, 2012.

(Continued)

*Primary Examiner* — Lester Kincaid
*Assistant Examiner* — Daniel Lai
(74) *Attorney, Agent, or Firm* — McDermott Will & Emery LLP

(57) ABSTRACT

An extracting unit detects movement from a first area to a second area, the first area and the second area defined as areas having different priorities. When the extracting unit detects the movement, this changes a communication process defined in the first area to the communication process defined in the second area. A notifying unit notifies that the area changed when the movement is detected. Herein, the priority of the first area and the priority of the second area are defined according to importance of a signal, which should be broadcasted from a processing unit.

16 Claims, 12 Drawing Sheets

(56) References Cited

U.S. PATENT DOCUMENTS

| | | | |
|---|---|---|---|
| 2008/0071474 A1* | 3/2008 | Harayama et al. | 701/211 |
| 2008/0085689 A1* | 4/2008 | Zellner | 455/187.1 |
| 2009/0224942 A1* | 9/2009 | Goudy et al. | 340/905 |
| 2009/0312037 A1* | 12/2009 | Jo et al. | 455/456.2 |
| 2009/0318175 A1* | 12/2009 | Sandberg | 455/502 |
| 2010/0173623 A1 | 7/2010 | Takami | |
| 2010/0273507 A1* | 10/2010 | Coupe et al. | 455/456.1 |
| 2011/0187559 A1* | 8/2011 | Applebaum | 340/907 |

FOREIGN PATENT DOCUMENTS

| | | |
|---|---|---|
| JP | 2003-078658 A | 3/2003 |
| JP | 2005-202913 A | 7/2005 |
| JP | 2007-259479 A | 10/2007 |
| JP | 2010-068206 A | 3/2010 |
| JP | 2010-124330 A | 6/2010 |
| JP | 2010-161657 A | 7/2010 |
| WO | WO 2009/080646 A1 | 7/2009 |

OTHER PUBLICATIONS

IEICE Engineering Science Society Conference 2009 (Proceedings of the Conference) Sep. 15-18, 2009, Niigata City.
International Search Report issued in International Application No. PCT/JP2011/004331mailed on Oct. 25, 2011.
Japanese Office Action with English Translation issued in Japanese Application No. 2011-284212 issued on Apr. 17, 2012.
Kazuhiro Miyatsu, "Technology Kaitaishinsyo, Bluetooth Gijutsu Kaisetsu Guide (Technical Guide to Bluetooth)," (RIC Telecom, Jun. 11, 2001), pp. 117-123.
"CSR's New Bluetooth Chip for High Quality and Low Power Consumption," Sep. 5, 2007, URL, http://k-tai.impress.co.jp/cda/article/news_toppage/36164.html.
Japanese Office Action with English Translation issued in Japanese Application No. 2011-551350 issued on Apr. 17, 2012.
Ishisono et al., "A study on Inter-Vehicle Communications of the Multi-Class Zone ITS Communication Scheme", The Institute of Electronics, Information and Communication Engineers, Jul. 2008, pp. 13-18.
Ishisono et al.,"Evaluation of Interference on the Multi-Class Zone ITS Communication Scheme", The Institute of Electronics, Information and Communication Engineers, Mar. 2010, pp. 13-18.
Kuramoto et al., "A real time ITS communication system for vehicle safety in instructions", The Institute of Electronics, Information and Communication Engineers, May 2006, pp. 35-39.
International Preliminary Report on Patentability issued in International Application No. PCT/JP2011/004331 Feb. 5, 2013.

\* cited by examiner

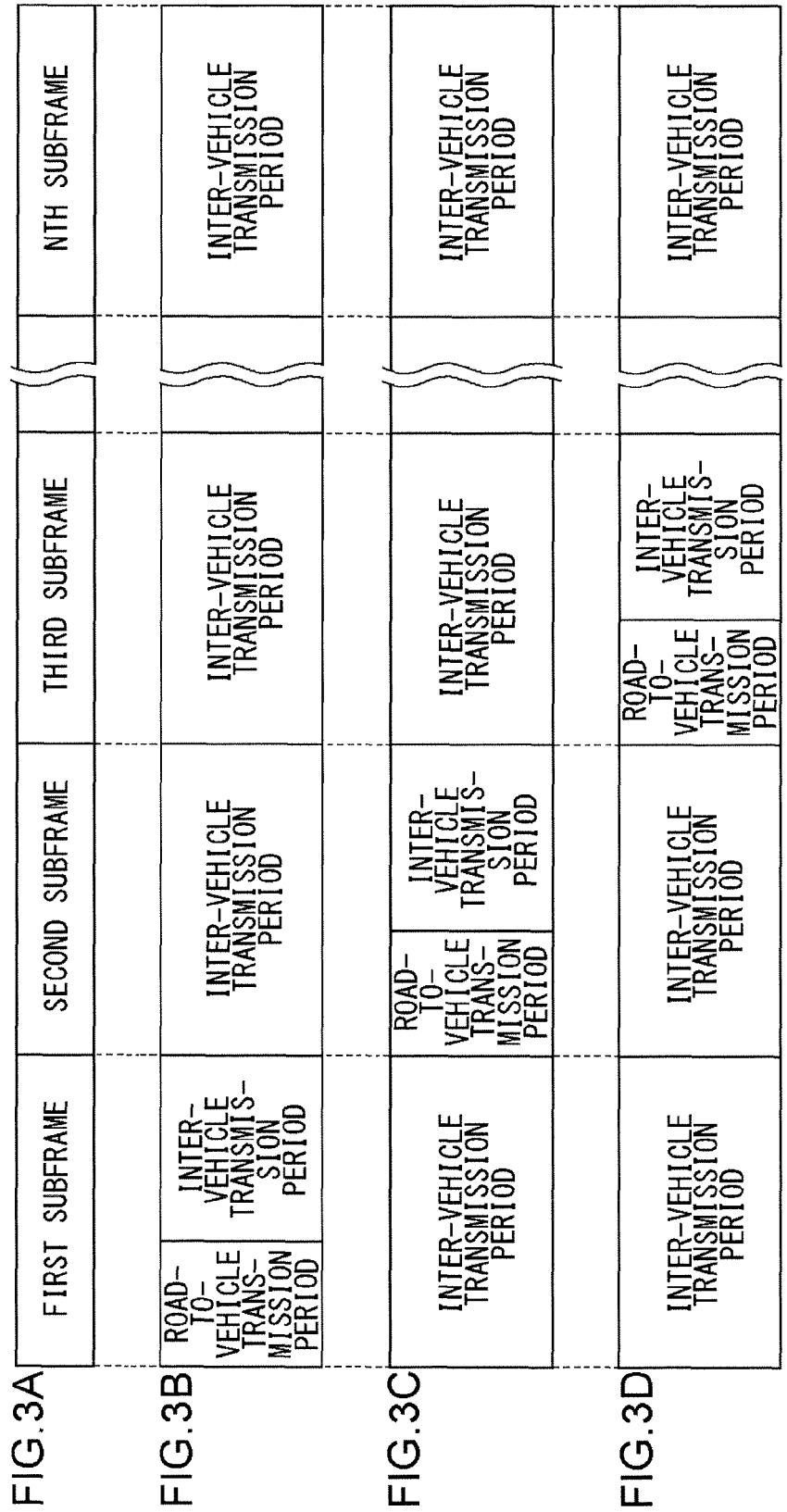

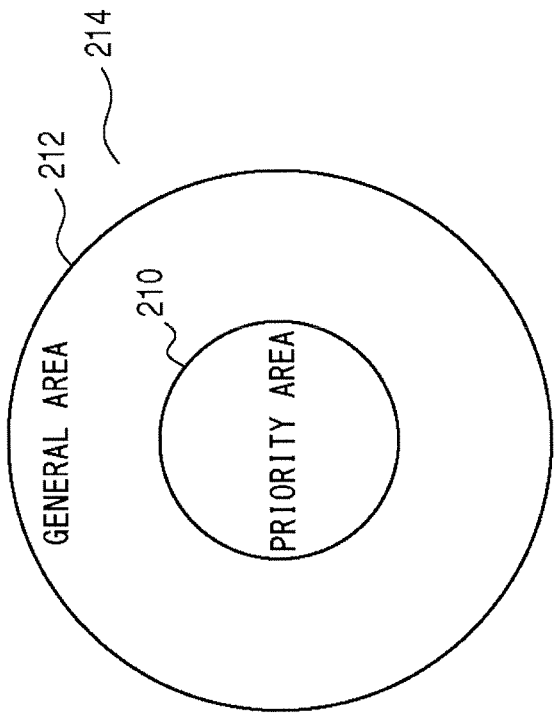
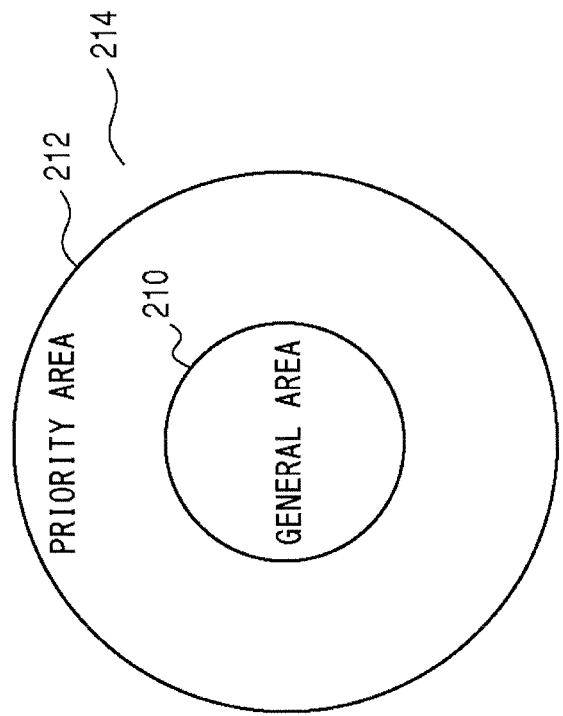

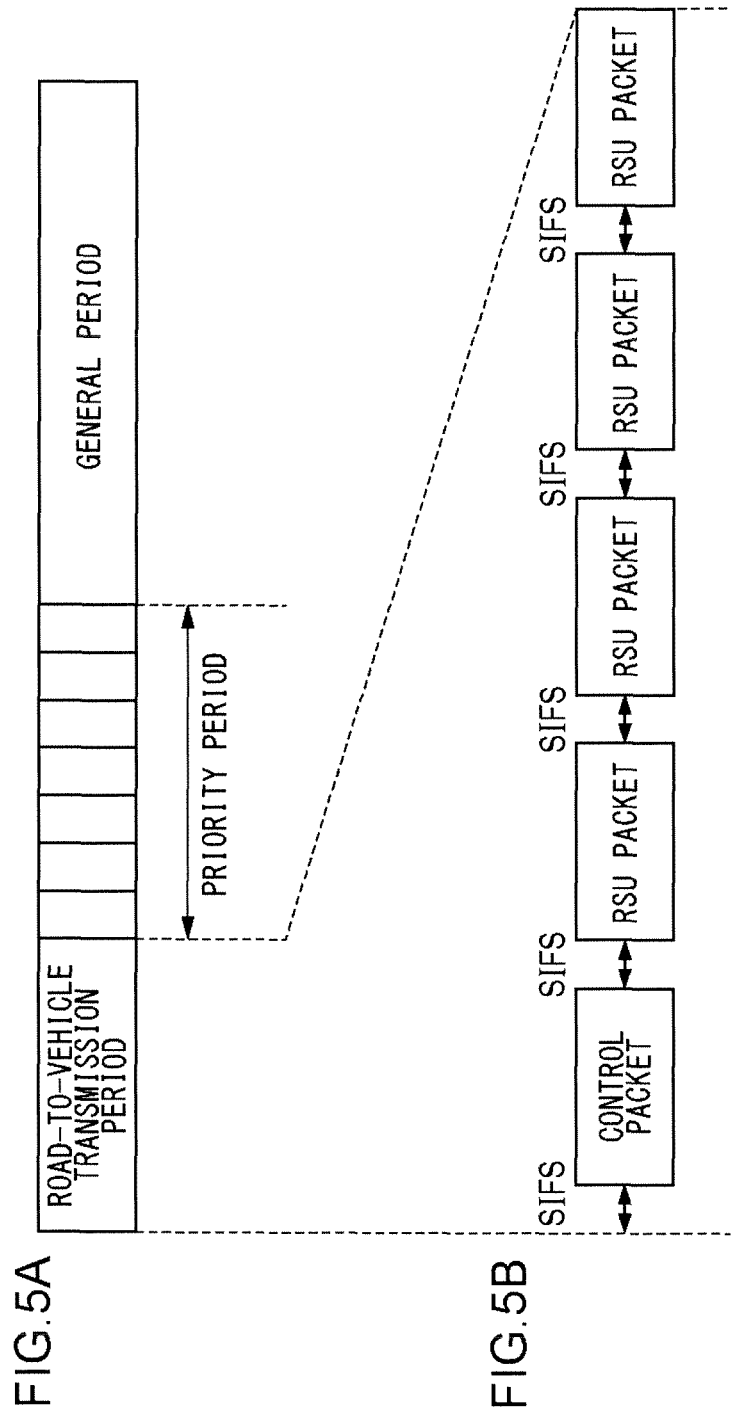

FIG.6A

| MAC HEADER | LLC HEADER | MESSAGE HEADER | DATA PAYLOAD | FCS |

FIG.6B

| PROTOCOL VERSION | TRANSMITTING NODE TYPE | NUMBER OF REUSED TIMES | TSF TIMER | RSU TRANSMISSION PERIOD LENGTH | INTER-VEHICLE SLOT SIZE | PRIORITY/GENERAL RATIO | PRIORITY/GENERAL THRESHOLD | PRIORITY AREA IDENTIFIER |

BASIC PART | EXPANDED PART

RADIO APPARATUS TRANSMITTING OR RECEIVING A SIGNAL INCLUDING PREDETERMINED INFORMATION

RELATED APPLICATIONS

This application is a Continuation of International Application No. PCT/JP2011/004331, filed on Jul. 29, 2011, which in turn claims the benefit of Japanese Application No. 2010-171668, filed on Jul. 30, 2010, the disclosures of which Applications are incorporated by reference herein.

BACKGROUND OF THE INVENTION

1. Field of the Invention

The present invention relates to communication technology and especially relates to a radio apparatus, which transmits or receives a signal including predetermined information.

2. Description of the Related Art

In order to prevent a collision accident at an intersection, road-to-vehicle communication has been studied. In the road-to-vehicle communication, information about a status at the intersection is communicated between a road-side apparatus and an in-vehicle apparatus. In the road-to-vehicle communication, it is required to install the road-side apparatus, so that time and effort and a cost increase.

On the other hand, in inter-vehicle communication, that is to say, a mode in which the information is communicated between the in-vehicle apparatuses, it is not required to install the road-side apparatus. In this case, by detecting current positional information in real time by a global positioning system (GPS) and the like, for example, and exchanging the positional information between the in-vehicle apparatuses, it is judged on which road, which enters the intersection, its own vehicle and other vehicles are located.

An access control function referred to as carrier sense multiple access with collision avoidance (CSMA/CA) is used in a wireless local area network (LAN), which meets the IEEE802.11 standards and the like. Therefore, one radio channel is shared by a plurality of terminal apparatuses in the wireless LAN. In such CSMA/CA, a packet signal is transmitted after it is confirmed that another packet signal is not transmitted by carrier sense.

On the other hand, when the wireless LAN is applied to the inter-vehicle communication such as intelligent transport systems (ITS), it is required to transmit the information to a large indefinite number of terminal apparatuses, so that it is desired that the signal is broadcast-transmitted. However, at the intersection and the like, by increase in traffic due to increase in the number of vehicles, that is to say, increase in the number of terminal apparatuses, it is supposed that collision of the packet signals increases. As a result, data included in the packet signal is not transferred to another terminal apparatus. When such a state occurs in the inter-vehicle communication, an object to prevent the collision accident at the intersection is not achieved. Also, since various communication environments are supposed, it is desired to execute a communication process according to a communication environment.

SUMMARY OF THE INVENTION

The present invention is achieved in view of such circumstances, and an object thereof is to provide the radio apparatus suitable for the communication environment.

In order to solve the above-described problem, a radio apparatus according to an aspect of the present invention is provided with a detecting unit configured to detect movement from a first area to a second area, the first area and the second area defined as areas having different priorities; a communicating unit configured to change a communication process defined in the first area to a communication process defined in the second area if the detecting unit detects the movement; and a notifying unit configured to notify that the area changed if the detecting unit detects the movement.

Another aspect of the present invention also is the radio apparatus. The apparatus is provided with a detecting unit configured to detect movement between a first area and a second area, the first area formed around an installed position of a base station apparatus and the second area formed on the outside of the first area relative to the base station apparatus; a communicating unit configured to change a communication process between the communication process in the first area, which should be performed according to operation timing of the base station apparatus, and a communication process in the second area, which should be performed irrespective of the operation timing of the base station apparatus, if the detecting unit detects the movement; and a notifying unit configured to notify that the area changed if the detecting unit detects the movement.

Still another aspect of the present invention also is the radio apparatus. The apparatus is the radio apparatus, which executes communication with another radio apparatus provided with an estimating unit configured to estimate whether the radio apparatus is present in a vehicle or on the outside of the vehicle; and a communicating unit configured to execute a transmission process and a reception process if the estimating unit estimates that the radio apparatus is present in the vehicle. The communicating unit stops at least one of the transmission process and the reception process if the estimating unit estimates that the radio apparatus is present on the outside of the vehicle.

Still another aspect of the present invention also is the radio apparatus. The apparatus, which executes communication with another radio apparatus, comprising: an estimating unit configured to estimate whether the radio apparatus is present in a predetermined area according to a reception status of a packet signal from a base station apparatus; and a communicating unit configured to execute a transmission process and a reception process. The communicating unit stops at least one of the transmission process and the reception process if the estimating unit estimates that the radio apparatus is present on the outside of the predetermined area.

The communicating unit stops the reception process out of the transmission process and the reception process.

Still another aspect of the present invention also is the radio apparatus. The apparatus, which executes communication with another radio apparatus, comprising: an estimating unit configured to estimate whether the radio apparatus is present in a vehicle or on the outside of the vehicle; a connecting unit connected to a power supply terminal provided on the vehicle; and a battery configured to drive the radio apparatus if the connecting unit is not connected to the power supply terminal. The estimating unit estimates that the radio apparatus is present on the outside of the vehicle if the radio apparatus is driven by the battery.

Meanwhile, optional combination of the above-described components and those obtained by converting representation of the present invention among a method, an apparatus, a system, a recording medium, and a computer program also are effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A to 3D are views illustrating formats of frames defined in a communication system in FIG. 1;

FIGS. 4A and 4B are views illustrating configurations of a priority area and a general area;

FIGS. 5A and 5B are views illustrating a configuration of a subframe in FIGS. 3A to 3D;

FIGS. 6A and 6B are views illustrating a format of a MAC frame stored in a packet signal defined in the communication system in FIG. 1;

DETAILED DESCRIPTION OF THE INVENTION

Figure 1:
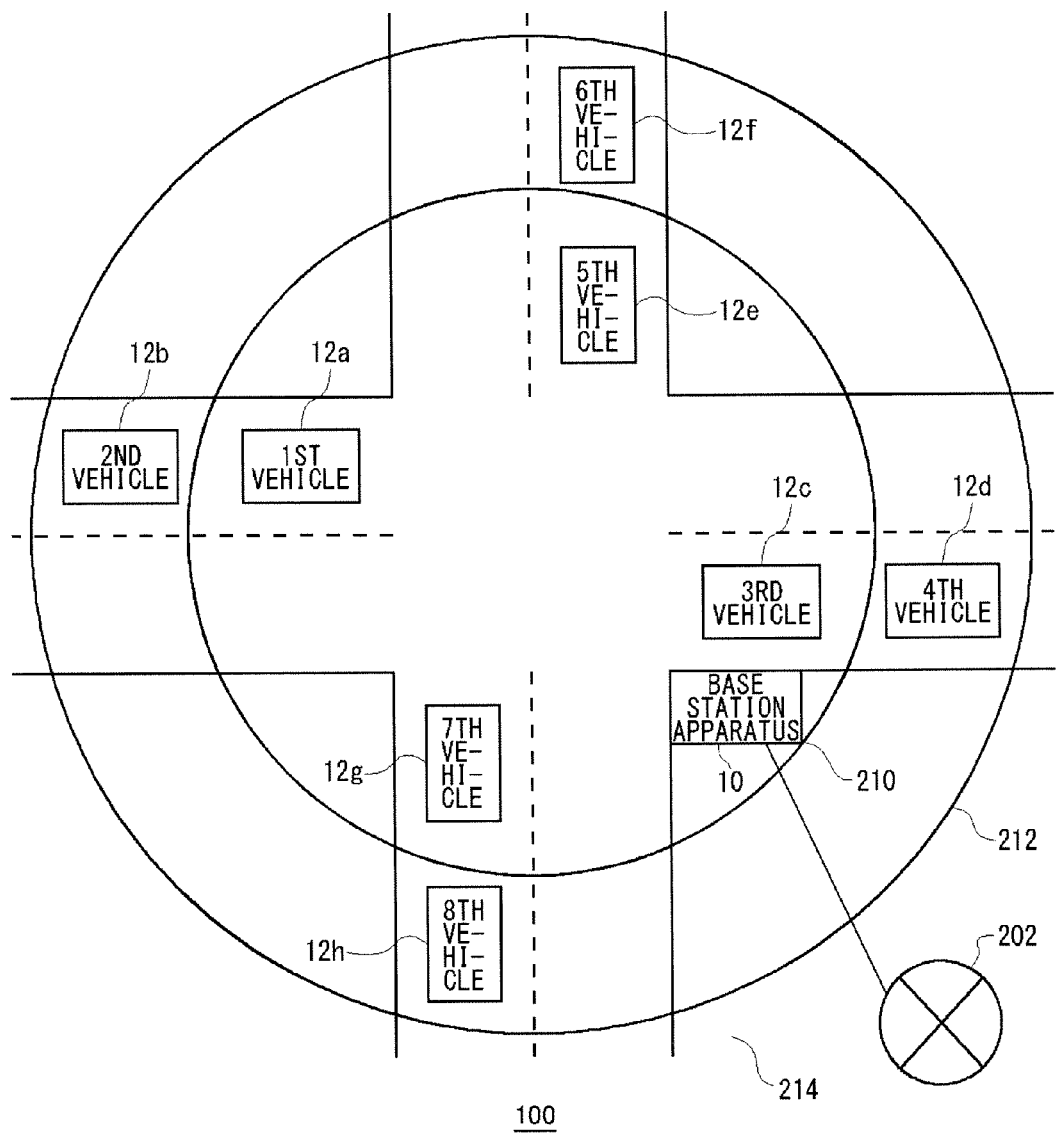
FIG. 1 is a view illustrating a configuration of a communication system according to an embodiment of the present invention.

The invention will now be described by reference to the preferred embodiments. This does not intend to limit the scope of the present invention, but to exemplify the invention.

Before specifically describing the present invention, we describe an outline thereof. An embodiment of the present invention relates to a communication system, which executes inter-vehicle communication between terminal apparatuses mounted on vehicles and also executes road-to-vehicle communication from a base station apparatus installed at an intersection and the like to the terminal apparatus. As the inter-vehicle communication, the terminal apparatus broadcast-transmits a packet signal in which information such as a speed and a position of the vehicle (hereinafter, referred to as "data") is stored. Also, another terminal apparatus receives the packet signal and recognizes approach and the like of the vehicle based on the data. Herein, the base station apparatus repeatedly defines a frame in which a plurality of subframes are included. The base station apparatus selects any one of a plurality of subframes for the road-to-vehicle communication and broadcast-transmits the packet signal in which control information and the like is stored in a period on a head part of the selected subframe.

The control information includes information about a period for the base station apparatus to broadcast-transmit the packet signal (hereinafter, referred to as a "road-to-vehicle transmission period"). The terminal apparatus specifies the road-to-vehicle transmission period based on the control information and transmits the packet signal in a period other than the road-to-vehicle transmission period. In this manner, time-division multiplexing of the road-to-vehicle communication and the inter-vehicle communication is performed, collision probability of the packet signals of both of them is decreased. That is to say, by recognition of contents of the control information by the terminal apparatus, interference between the road-to-vehicle communication and the inter-vehicle communication is decreased. Also, areas in which the terminal apparatus, which executes the inter-vehicle communication, is present are principally classified into three types.

One of them is the area formed around the base station apparatus (hereinafter, referred to as a "first area), another one is the area formed on the outside of the first area (hereinafter, referred to as a "second area"), and still another one is the area formed on the outside of the second area (hereinafter, referred to as an "outside of the second area"). Herein, although the terminal apparatus may receive the packet signal from the base station apparatus with a certain level of quality in the first and second areas, the terminal apparatus cannot receive the packet signal from the base station apparatus with a certain level of quality on the outside of the second area. Also, the first area is formed so as to be closer to the center of the intersection than the second area. Herein, following two statuses are supposed according to a shape of the intersection.

A first status is a case in which the vehicle present in the second area is going to enter the intersection, so that the packet signal from the terminal apparatus mounted on this vehicle is considered to be important information in terms of inhibiting a collision accident. A second status is a case in which the vehicle present in the first area is present in the vicinity of the intersection, so that the packet signal from the terminal apparatus mounted on this vehicle is considered to be the important information in terms of inhibiting the collision accident. In this manner, it is required to set a priority according to a position at which the packet signal should be transmitted. Meanwhile, if a driver may recognize the priority set for the area in which the vehicle is present, the driver may reflect the same to driving. For example, if the driver recognizes that the vehicle is present in the area with a high priority, the driver may drive more carefully because possibility of the collision accident is high. Therefore, it is desired to allow the driver to recognize the priority set for the area in which the vehicle is present.

Corresponding to such definition of the area, a period for the inter-vehicle communication (hereinafter, referred to as an "inter-vehicle transmission period") is formed by the time-division multiplexing of a priority period and a general period. The priority period is formed of a plurality of slots and the terminal apparatus broadcasts the packet signal by any one of a plurality of slots. Also, the general period has a predetermined period and the terminal apparatus broadcasts the packet signal by a CSMA scheme in the general period. The terminal apparatus present on the outside of the second area transmits the packet signal by the CSMA scheme irrespective of a configuration of the frame. In the above-described first status, the terminal apparatus present in the second area is allowed to use the priority period and the terminal apparatus present in the first area is allowed to use the general period. Also, in the above-described second status, the terminal apparatus present in the first area is allowed to use the priority period and the terminal apparatus present in the second area is allowed to use the general period.

Herein, it is judged in which area the terminal apparatus mounted on the vehicle is present. It is preferable for the driver to be able to recognize the area in which the terminal apparatus is present. When a risk of the collision accident is higher in the priority area than in the general area, if the driver recognizes presence in the priority area, the driver may drive more carefully. That is to say, it is possible to invite the driver's attention. In order to respond to this, the terminal apparatus notifies the driver of the area in which this is present, thereby allowing the driver to recognize change in the area.

FIG. 1 illustrates a configuration of a communication system 100 according to the embodiment of the present invention. This corresponds to a case in which one intersection is seen from above. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as vehicles 12, and a network 202. Meanwhile, the terminal apparatus not illustrated is mounted on each vehicle 12. Also, a first area 210 is formed around the base station apparatus 10, a second area 212 is formed on the outside of the first area 210, and the outside of the second area 214 is formed on the outside of the second area 212.

As illustrated, a road in a horizontal direction, that is to say, in a right-left direction of the drawing and a road in a vertical direction, that is to say, in an up-down direction of the drawing intersect with each other on a central portion. Herein, an upper side of the drawing corresponds to the "north", a left side thereof corresponds to the "west", a lower side thereof corresponds to the "south", and a right side thereof corresponds to the "east". Also, a portion at which the two roads intersect with each other is the "intersection". The first and second vehicles 12a and 12b travel from left to right and the third and fourth vehicles 12c and 12d travel from right to left. Also, the fifth and sixth vehicles 12e and 12f travel from above downward and the seventh and eighth vehicles 12g and 12h travel from below upward.

In the communication system 100, the base station apparatus 10 is arranged at the intersection. The base station apparatus 10 controls communication between the terminal apparatuses. The base station apparatus 10 repeatedly generates the frame including a plurality of subframes based on a signal received from a GPS satellite not illustrated and the frame formed by another base station apparatus 10 not illustrated. Herein, it is defined such that the road-to-vehicle transmission period may be set on the head part of each subframe. The base station apparatus 10 selects the subframe in which the road-to-vehicle transmission period is not set by another base station apparatus 10 out of a plurality of subframes. The base station apparatus 10 sets the road-to-vehicle transmission period on the head part of the selected subframe. The base station apparatus 10 broadcasts the packet signal in the set road-to-vehicle transmission period.

A plurality of types of data are supposed as the data, which should be included in the packet signal. One of them is the data such as traffic jam information and construction information and another one is the data about each slot included in the priority period. The latter includes the slot, which is not used by any terminal apparatus (hereinafter, referred to as an "empty slot"), the slot used by one terminal apparatus (hereinafter, referred to as a "used slot"), and the slot used by a plurality of terminal apparatuses (hereinafter, referred to as a "collision slot"). The packet signal including the data such as the traffic jam information and the construction information (hereinafter, referred to as an "RSU packet signal") and the packet signal including the data about each slot (hereinafter, referred to as a "control packet signal") are separately generated. The RSU packet signal and the control packet signal are collectively referred to as the "packet signals".

The first area 210 and the second area 212 are formed around the communication system 100 according to a reception status at the time when the terminal apparatus receives the packet signal from the base station apparatus 10. As illustrated, the first area 210 is formed in the vicinity of the base station apparatus 10 as the area in which the reception status is relatively excellent. It also may be said that the first area 210 is formed in the vicinity of a central portion of the intersection. On the other hand, the second area 212 is formed on the outside of the first area 210 as the area in which the reception status is worse than that in the first area 210. Further, the outside of the second area 214 is formed on the outside of the second area 212 as the area in which the reception status is further worse than that in the second area 212. Meanwhile, an error rate and received power of the packet signal are used as the reception status.

Two types of control information are included in the packet signal from the base station apparatus 10, one of which is information about the set road-to-vehicle transmission period (hereinafter, referred to as a "basic part") and the other of which is the information about the set priority period (hereinafter, referred to as an "expanded part"). The terminal apparatus generates the frame based on the basic part included in the received packet signal. As a result, the frame generated by each of a plurality of terminal apparatuses is synchronized with the frame generated by the base station apparatus 10. Also, the terminal apparatus receives the packet signal broadcasted by the base station apparatus 10 and estimates in which of the first area 210, the second area 212, and the outside of the second area 214 this is present based on the reception status and the expanded part of the received packet signal.

Further, the information indicating correspondence between the area and the inter-vehicle transmission period (hereinafter, referred to as a "priority area identifier") is included in the expanded part included in the packet signal from the base station apparatus 10. It may be said that the information indicating the correspondence between the area and the inter-vehicle transmission period is the information indicating in which of the first area 210 and the second area 212 the priority period should be used. Herein, a first arrangement and a second arrangement are defined, and in the first arrangement, the general period is used in the first area 210 and the priority period is used in the second area 212. On the other hand, in the second arrangement, the priority period is used in the first area 210 and the general period is used in the second area 212. The terminal apparatus broadcasts the packet signal by carrier sense in the general period when the priority area identifier indicates the first arrangement and this is present in the first area 210, and broadcasts the packet signal by any one of the slots included in the priority period when this is present in the second area 212. The terminal apparatus broadcasts the packet signal by any one of the slots included in the priority period when the priority area identifier indicates the second arrangement and this is present in the first area 210, and broadcasts the packet signal by the carrier sense in the general period when this is present in the second area 212.

As a result, TDMA is executed in the priority period and CSMA/CA is executed in the general period. Meanwhile, the terminal apparatus selects the subframe having identical relative timing also in a next frame. Especially, in the priority period, the terminal apparatus selects the slot having the identical relative timing in the next frame. Herein, the terminal apparatus obtains the data and stores the data in the packet signal. Information about a present position, for example, is included in the data. The terminal apparatus also stores the control information in the packet signal. That is to say, the control information transmitted from the base station apparatus 10 is transferred by the terminal apparatus. On the other hand, when the terminal apparatus estimates that this is present on the outside of the second area 214, this executes the CSMA/CA irrespective of the configuration of the frame, thereby broadcasting the packet signal.

Figure 2:
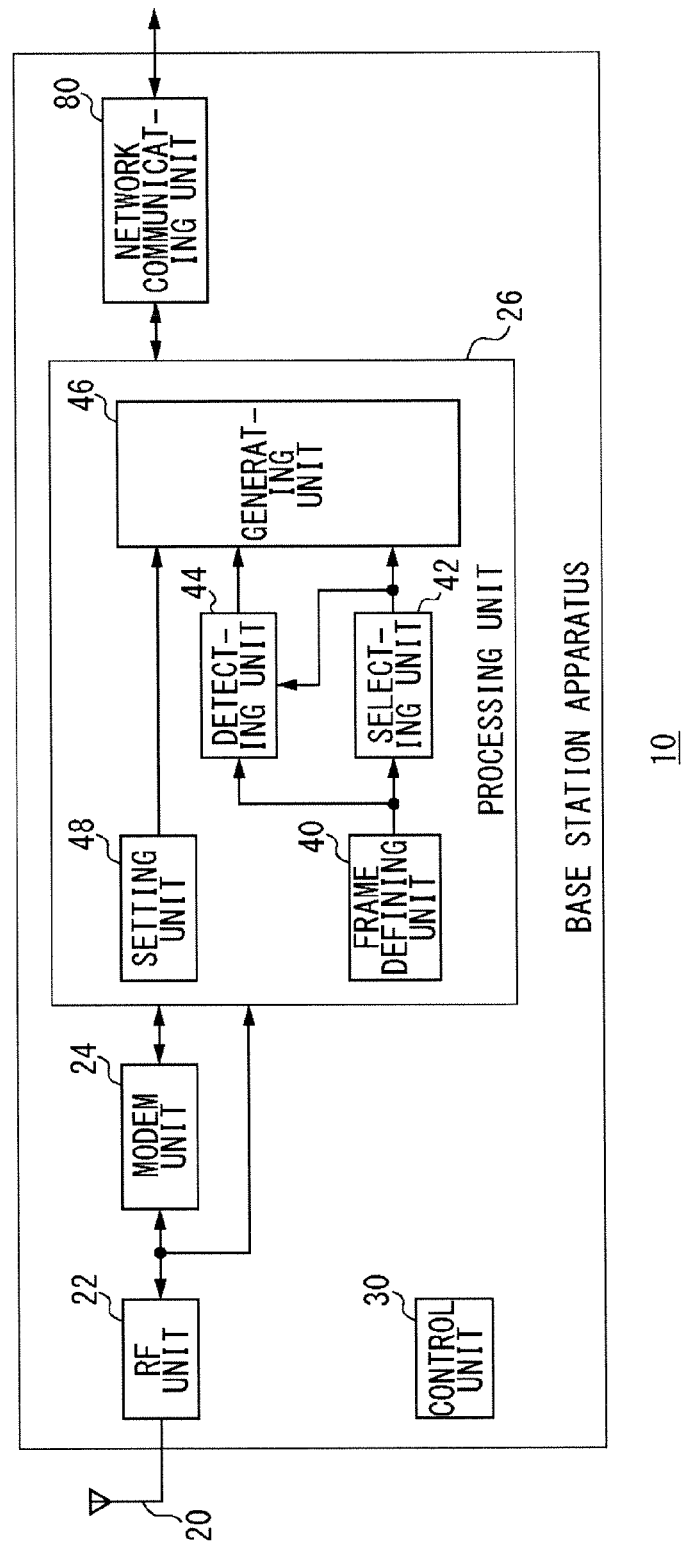
FIG. 2 is a view illustrating a configuration of a base station apparatus in FIG. 1.

FIG. 2 illustrates a configuration of the base station apparatus 10. The base station apparatus 10 includes an antenna 20, an RF unit 22, a modem unit 24, a processing unit 26, a control unit 30, and a network communicating unit 80. The processing unit 26 includes a frame defining unit 40, a selecting unit 42, a detecting unit 44, a generating unit 46, and a setting unit 48. The RF unit 22 receives the packet signal from the terminal apparatus and another base station apparatus 10 not illustrated by the antenna 20 as a reception process. The RF unit 22 executes frequency conversion of the received packet signal at a radio frequency, thereby generating a baseband packet signal. Further, the RF unit 22 outputs the baseband packet signal to the modem unit 24. In general, the baseband packet signal is formed of an in-phase component and a quadrature component, so that two signal lines should be indicated; however, only one signal line is herein indicated for making the drawing clear. The RF unit 22 also includes a low noise amplifier (LNA), a mixer, an AGC, and an A/D converting unit.

The RF unit 22 executes the frequency conversion of the baseband packet signal input from the modem unit 24, thereby generating the packet signal at the radio frequency as a transmission process. Further, the RF unit 22 transmits the packet signal at the radio frequency from the antenna 20 in the road-to-vehicle transmission period. The RF unit 22 also includes a power amplifier (PA), the mixer, and a D/A converting unit.

The modem unit 24 executes demodulation of the baseband packet signal from the RF unit 22 as the reception process. Further, the modem unit 24 outputs a demodulated result to the processing unit 26. Also, the modem unit 24 executes modulation of the data from the processing unit 26 as the transmission process. Further, the modem unit 24 outputs a modulated result to the RF unit 22 as the baseband packet signal. Herein, since the communication system 100 supports an orthogonal frequency division multiplexing (OFDM) modulation method, the modem unit 24 also executes fast Fourier transform (FFT) as the reception process and executes inverse fast Fourier transform (IFFT) as the transmission process.

The frame defining unit 40 receives the signal from the GPS satellite not illustrated and obtains information of time based on the received signal. Meanwhile, the well-known technology may be used for obtaining the information of time, so that the description thereof is not repeated here. The frame defining unit 40 generates a plurality of frames based on the information of time. For example, the frame defining unit 40 generates 10 frames of "100 msec" by dividing a period of "1 sec" into ten parts based on timing indicated by the information of time. It is defined such that the frames are repeated by repeating such process. Meanwhile, the frame defining unit 40 may detect the control information from the demodulated result and generate the frame based on the detected control information. Such process corresponds to generation of the frame synchronized with the timing of the frame formed by another base station apparatus 10. FIGS. 3A to 3D illustrate formats of the frames defined in the communication system 100. FIG. 3A illustrates the configuration of the frame. The frame is formed of N subframes represented as first to Nth subframes. For example, when a length of the frame is 100 msec and N is 8, the subframes having a length of 12.5 msec are defined. FIGS. 3B to 3D will be described later, and FIG. 2 is referred to again.

The selecting unit 42 selects the subframe in which the road-to-vehicle transmission period should be set out of a plurality of subframes included in the frame. Specifically described, the selecting unit 42 receives the frame defined by the frame defining unit 40. The selecting unit 42 inputs the demodulated result from another base station apparatus 10 or the terminal apparatus not illustrated through the RF unit 22 and the modem unit 24. The selecting unit 42 extracts the demodulated result from another base station apparatus 10 out of input demodulated results. A method of extracting is to be described later. The selecting unit 42 specifies the subframe, which receives the demodulated result, thereby specifying the subframe, which does not receive the demodulated result. This corresponds to specification of the subframe in which the road-to-vehicle transmission period is not set by another base station apparatus 10, that is to say, an unused subframe. When there are a plurality of unused subframes, the selecting unit 42 randomly selects one subframe. When there is not the unused subframe, that is to say, when each of a plurality of subframes is used, the selecting unit 42 obtains the received power corresponding to the demodulated result and preferentially selects the subframe with small received power.

FIG. 3B illustrates the configuration of the frame generated by a first base station apparatus 10a. The first base station apparatus 10a sets the road-to-vehicle transmission period on the head part of the first subframe. Also, the first base station apparatus 10a sets the inter-vehicle transmission period following the road-to-vehicle transmission period in the first subframe. The inter-vehicle transmission period is the period in which the terminal apparatus may broadcast the packet signal. That is to say, it is defined such that the first base station apparatus 10a may broadcast the packet signal in the road-to-vehicle transmission period being a head period of the first subframe and the terminal apparatus may broadcast the packet signal in the inter-vehicle transmission period other than the road-to-vehicle transmission period in the frame. Further, the first base station apparatus 10a sets only the inter-vehicle transmission period in the second to Nth subframes.

FIG. 3C illustrates the configuration of the frame generated by a second base station apparatus 10b. The second base station apparatus 10b sets the road-to-vehicle transmission period on the head part of the second subframe. Also, the second base station apparatus 10b sets the inter-vehicle transmission period in a part subsequent to the road-to-vehicle transmission period in the second subframe, the first subframe and the third to Nth subframes. FIG. 3D illustrates the configuration of the frame generated by a third base station apparatus 10c. The third base station apparatus 10c sets the road-to-vehicle transmission period on the head part of the third subframe. Also, the third base station apparatus 10c sets the inter-vehicle transmission period in a part subsequent to the road-to-vehicle transmission period in the third subframe, the first subframe, the second subframe, and the fourth to Nth subframes. In this manner, a plurality of base station apparatuses 10 select different subframes and set the road-to-vehicle transmission period on the head part of the selected subframe. FIG. 2 is referred to again. The selecting unit 42 outputs a number of the selected subframe to the detecting unit 44 and the generating unit 46.

The setting unit 48 has an interface for receiving an instruction from a business operator and receives a setting instruction of a parameter through the interface. For example, the interface is a button and the setting unit 48 receives the setting instruction of the parameter by an input to the button. Also, the interface may be a connecting terminal to the network communicating unit 80 to be described later. At that time, the setting unit 48 receives the setting instruction of the parameter through the network communicating unit 80 and the network 202 and a personal computer not illustrated. Herein, the setting instruction of the parameter is about whether to use the first arrangement or use the second arrangement. The setting unit 48 outputs the received setting instruction to the generating unit 46.

FIGS. 4A and 4B are views illustrating configurations of the priority area and the general area. The first area 210, the second area 212, and the outside of the second area 214 illustrated in the drawings are similar to those in FIG. 1. FIG. 4A corresponds to the first arrangement. The first area 210 around the base station apparatus 10 not illustrated is set as the general area. The general area is the area in which the general period should be used. Therefore, a terminal apparatus 14 present in the general area may broadcast the packet signal in the general period. The second area enclosing the first area 210 is set as the priority area. The priority area is the area in which the priority period should be used. Therefore, the terminal apparatus 14 present in the priority area may broadcast the packet signal in each slot forming the priority period. FIG. 4B corresponds to the second arrangement. The first area 210 is set as the priority period and the second area 212 is set as the general period. Meanwhile, sizes of the first area 210 and the second area 212 may be different in the first arrangement and in the second arrangement. FIG. 2 is referred to again.

The detecting unit 44 specifies whether each of a plurality of slots included in the priority period is unused or being used, or collision occurs therein. Before describing a process of the detecting unit 44, we herein describe a configuration of the subframe. FIGS. 5A and 5B illustrate the configuration of the subframe. As illustrated, one subframe is composed of the road-to-vehicle transmission period, the priority period, and the general period in this order. The base station apparatus 10 broadcasts the packet signal in the road-to-vehicle transmission period, the priority period is formed by the time-division multiplexing of a plurality of slots and the terminal apparatus 14 may broadcast the packet signal in each slot, and the general period has a predetermined length and the terminal apparatus 14 may broadcast the packet signal. The priority period and the general period correspond to the inter-vehicle transmission period in FIG. 3B and the like. Meanwhile, when the road-to-vehicle transmission period is not included in the subframe, the subframe is composed of the priority period and the general period in this order. At that time, the road-to-vehicle transmission period also is the priority period. FIG. 5B is to be described later. FIG. 3 is referred to again.

The detecting unit 44 measures the received power for each slot and also measures the error rate for each slot. An example of the error rate is a bit error rate (BER). When the received power is smaller than a threshold for received power, the detecting unit 44 judges that this slot is unused (hereinafter, such slot is referred to as the "empty slot"). On the other hand, when the received power is not smaller than the threshold for received power and the error rate is lower than a threshold for error rate, the detecting unit 44 judges that this slot is in use (hereinafter, such slot is referred to as the "used slot"). When the received power is not smaller than the threshold for received power and the error rate is not lower than the threshold for error rate, the detecting unit 44 judges that collision occurs in this slot (hereinafter, such slot is referred to as the "collision slot"). The detecting unit 44 executes such process for all the slots and outputs a result (hereinafter, referred to as a "detected result") to the generating unit 46.

The generating unit 46 receives the setting instruction from the setting unit 48, receives the number of the subframe from the selecting unit 42, and receives the detected result from the detecting unit 44. The generating unit 46 sets the road-to-vehicle transmission period in the subframe having the received subframe number and generates the control packet signal and the RSU packet signal, which should be broadcasted in the road-to-vehicle transmission period. FIG. 5B illustrates an arrangement of the packet signal in the road-to-vehicle transmission period. As illustrated, one control packet signal and a plurality of RSU packet signals are arranged in the road-to-vehicle transmission period. Herein, adjacent packet signals are separated from each other by a short inter-frame space (SIFS). FIG. 2 is referred to again.

Configurations of the control packet signal and the RSU packet signal are herein described. FIGS. 6A and 6B illustrate a format of a MAC frame stored in the packet signal defined in the communication system 100. FIG. 6A illustrates the format of the MAC frame. In this MAC frame, a "MAC header", an "LLC header", a "message header", a "data payload", and a "FCS" are arranged in this order from a head thereof. When the detected result is included in the data payload, the packet signal in which the MAC frame is stored corresponds to the control packet signal. Also, when the generating unit 46 receives the data such as the traffic jam information and the construction information from the network communicating unit 80, this stores them in the data payload. The packet signal in which such MAC frame is stored corresponds to the RSU packet signal. Herein, the network communicating unit 80 is connected to the network 202 not illustrated. The packet signal broadcasted in the priority period and the general period also stores the MAC frame illustrated in FIG. 6A.

FIG. 6B is a view illustrating a configuration of the message header generated by the generating unit 46. The message header includes the basic part and the expanded part. As described above, the configuration of the control packet signal and that of the RSU packet signal are identical to each other, so that the basic part and the expanded part are included therein. The basic part includes a "protocol version", a "transmitting node type", a "number of reused times", a "TSF timer", and an "RSU transmission period length" and the expanded part includes an "inter-vehicle slot size", a "priority/general ratio", a "priority/general threshold", and a "priority area identifier".

The protocol version indicates a version of a corresponding protocol. The transmitting node type indicates a source of the packet signal in which the MAC frame is included. For example, "0" indicates the terminal apparatus and "1" indicates the base station apparatus 10. When the selecting unit 42 extracts the demodulated result from another base station apparatus 10 out of the input demodulated results, the selecting unit 42 utilizes a value of the transmitting node type. The number of reused times indicates an index of validity when the message header is transferred by the terminal apparatus and the TSF timer indicates a transmission time. The RSU transmission period length indicates a length of the road-to-vehicle transmission period and it may be said that this is the information about the road-to-vehicle transmission period.

The inter-vehicle slot size indicates a size of the slot included in the priority period, the priority/general ratio indicates a ratio of the priority period and the general period, and the priority/general threshold is the threshold for allowing the terminal apparatus 14 to select usage of the priority period or usage of the general period and is the threshold for the received power. The priority area identifier is the identifier for indicating which of the first arrangement and the second arrangement is used. Herein, when the first arrangement is used, that is to say, when the arrangement in FIG. 4A is used, the priority area identifier is set to "0". Also, when the second arrangement is used, that is to say, when the arrangement in FIG. 4B is used, the priority area identifier is set to "1". In this manner, the expanded part corresponds to the information about the priority period and the general period. FIG. 2 is referred to again.

The processing unit 26 allows the modem unit 24 and the RF unit 22 to broadcast-transmit the packet signal in the road-to-vehicle transmission period. That is to say, the processing unit 26 broadcasts the control packet signal and the RSU packet signal including the basic part and the expanded part in a base station broadcasting period. The control unit 30 controls a process of an entire base station apparatus 10.

Although this configuration may be realized by a CPU, a memory, and another LSI of an optional computer in a hardware aspect and is realized by a program loaded on the memory and the like in a software aspect, a functional block realized by combination of them is herein described. Therefore, one skilled in the art may comprehend that the functional block may be realized in various modes only by hardware or combination of the hardware and software.

Figure 7:
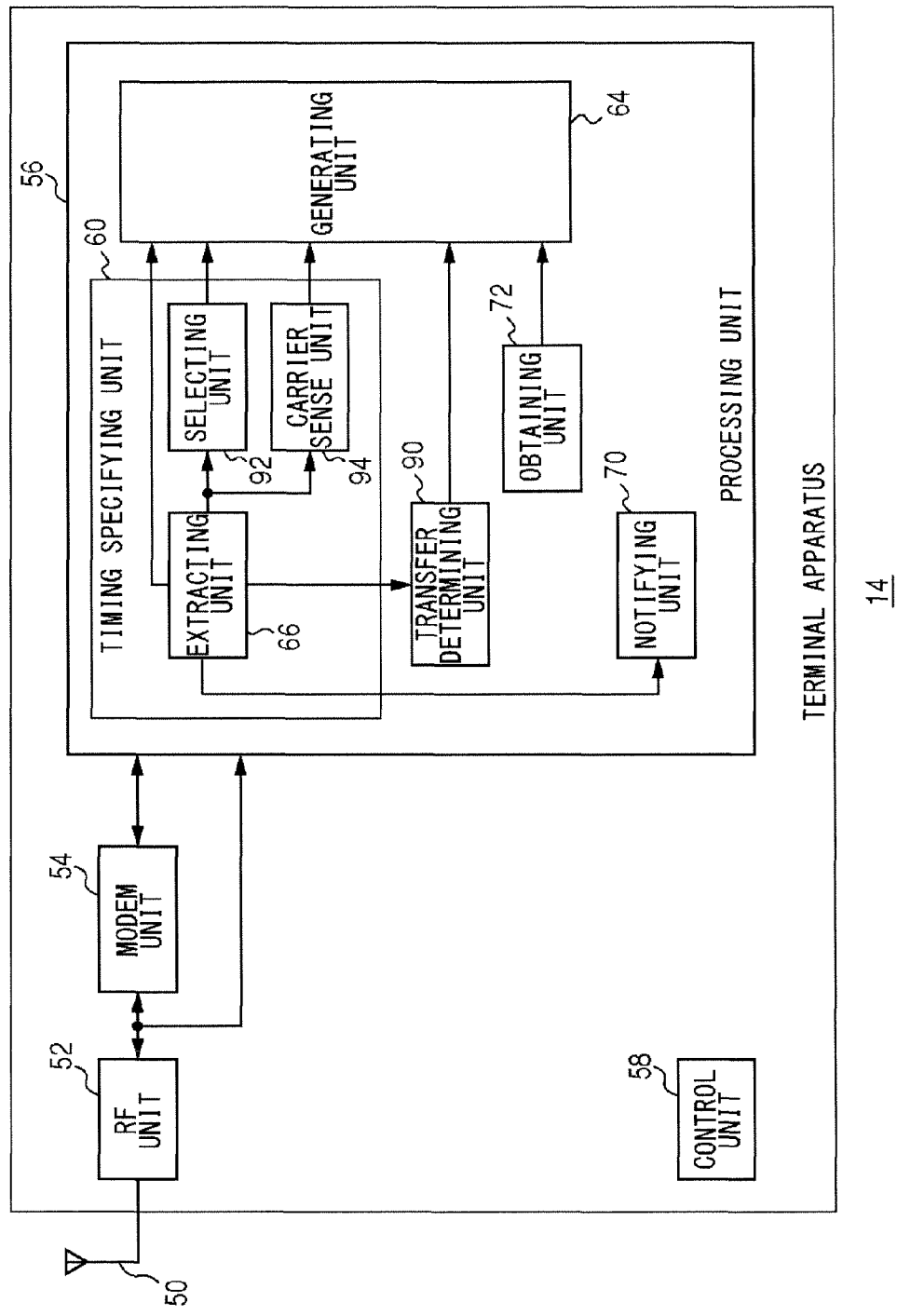
FIG. 7 is a view illustrating a configuration of a terminal apparatus mounted on a vehicle in FIG. 1.

FIG. 7 illustrates a configuration of the terminal apparatus 14 mounted on the vehicle 12. The terminal apparatus 14 includes an antenna 50, an RF unit 52, a modem unit 54, a processing unit 56, and a control unit 58. The processing unit 56 includes a generating unit 64, a timing specifying unit 60, a transfer determining unit 90, a notifying unit 70, and an obtaining unit 72. Also, the timing specifying unit 60 includes an extracting unit 66, a selecting unit 92, and a carrier sense unit 94. The antenna 50, the RF unit 52, and the modem unit 54 execute the processes similar to those of the antenna 20, the RF unit 22, and the modem unit 24 in FIG. 2. Therefore, difference is herein mainly described.

The modem unit 54 and the processing unit 56 receive the packet signal from another terminal apparatus 14 and the base station apparatus 10 not illustrated. Meanwhile, as described above, the modem unit 54 and the processing unit 56 receive the packet signal from the base station apparatus 10 in the road-to-vehicle transmission period. As described above, the modem unit 54 and the processing unit 56 receive the packet signal from another terminal apparatus 14 in the priority period and the general period.

The extracting unit 66 specifies the timing of the subframe in which the road-to-vehicle transmission period is arranged when the demodulated result from the modem unit 54 is the packet signal from the base station apparatus 10 not illustrated. Also, the extracting unit 66 generates the frame based on the timing of the subframe and contents of the basic part in the message header of the packet signal, specifically, the contents of the RSU transmission period length. Meanwhile, the frame may be generated in the same manner as in the above-described frame defining unit 40, so that the description thereof is not repeated here. As a result, the extracting unit 66 generates the frame synchronized with the frame formed by the base station apparatus 10.

The extracting unit 66 measures the received power of the packet signal from the base station apparatus 10. The extracting unit 66 estimates whether the terminal apparatus is present in the first area 210, in the second area 212, or on the outside of the second area 214 based on the measured received power. For example, the extracting unit 66 stores a threshold for area judgment. The threshold for area judgment corresponds to the above-described priority/general threshold. When the received power is larger than the threshold for area judgment, the extracting unit 66 determines that the terminal apparatus is present in the first area 210. When the received power is not larger than the threshold for area judgment, the extracting unit 66 determines that the terminal apparatus is present in the second area 212. When the packet signal from the base station apparatus 10 is not received, the extracting unit 66 determines that the terminal apparatus is present on the outside of the second area 212. Meanwhile, the extracting unit 66 may use the error rate and combination of the received power and the error rate in place of the received power.

The extracting unit 66 determines whether the area in which the terminal apparatus is now present is the priority area or the general area based on an estimated result and the priority area identifier. When the priority area identifier is "1", the extracting unit 66 selects the priority area when the terminal apparatus is present in the first area 210 and selects the general area when this is present in the second area 212. On the other hand, when the priority area identifier is "0", the extracting unit 66 selects the general area when this is present in the first area 210 and selects the priority area when the terminal apparatus is present in the second area 212.

Further, the extracting unit 66 selects timing, which is not related to the configuration of the frame, when this estimates that the terminal apparatus is present on the outside of the second area 214. The extracting unit 66 selects the general period when this selects the general area. The extracting unit 66 selects the priority period when this selects the priority area. When the extracting unit 66 selects the priority period, this outputs the detected result included in the data payload of the control packet signal to the selecting unit 92. When the extracting unit 66 selects the general period, this outputs the timings of the frame and the subframe and the information about the inter-vehicle transmission period to the carrier sense unit 94. The extracting unit 66 instructs the carrier sense unit 94 to execute the carrier sense when this selects the timing, which is not related to the configuration of the frame.

The selecting unit 92 receives the detected result from the extracting unit 66. As described above, the detected result indicates whether each of a plurality slots included in the priority period is the empty slot, the used slot or the collision slot. The selecting unit 92 selects any one of the empty slots. When the slot is already selected, the selecting unit 92 continuously selects the identical slot when this slot is the used slot. On the other hand, when the slot is already selected, the selecting unit 92 newly selects the empty slot when this slot is the collision slot. The selecting unit 92 notifies the generating unit 64 of the information about the selected slot as transmission timing.

The carrier sense unit 94 receives the timings of the frame and the subframe and the information about the inter-vehicle transmission period from the extracting unit 66. The carrier sense unit 94 measures interference power by executing the carrier sense in the general period. Also, the carrier sense unit 94 determines the transmission timing in the general period based on the interference power. Specifically described, the carrier sense unit 94 stores a predetermined threshold in advance and compares the interference power with the threshold. When the interference power is smaller than the threshold, the carrier sense unit 94 determines the transmission timing. The carrier sense unit 94 determines the transmission timing by executing the CSMA without considering the configuration of the frame when this is instructed by the extracting unit 66 to execute the carrier sense. The carrier sense unit 94 notifies the generating unit 64 of the determined transmission timing.

The obtaining unit 72 includes a GPS receiver, a gyroscope, a vehicle speed sensor and the like not illustrated and obtains a present position, a travel direction, a moving speed and the like (hereinafter, collectively referred to as "positional information") of the vehicle 12 not illustrated, that is to say, the vehicle 12 on which the terminal apparatus 14 is mounted by the data supplied therefrom. Meanwhile, the present position is indicated by latitude and longitude. The well-known technology may be used to obtain them, so that the description thereof is not repeated here. The obtaining unit 72 outputs the positional information to the generating unit 64.

The transfer determining unit 90 controls transfer of the message header. The transfer determining unit 90 extracts the message header from the packet signal. When the packet signal is directly transmitted from the base station apparatus 10, the number of reused times is set to "0"; however, when the packet signal is transmitted from another terminal apparatus 14, the number of reused times is set to a value "1 or larger". The transfer determining unit 90 selects the message header, which should be transferred, from the extracted message headers. Herein, the message header having the smallest number of reused times is selected, for example. The transfer determining unit 90 may also generate a new message header by synthesizing contents included in a plurality of message headers. The transfer determining unit 90 outputs the message header, which is a target of selection, to the generating unit 64. At that time, the transfer determining unit 90 increments the number of reused times by "1".

The generating unit 64 receives the positional information from the obtaining unit 72 and receives the message header from the transfer determining unit 90. The generating unit 64 uses the MAC frame illustrated in FIGS. 6A and 6B to store the positional information in the data payload. The generating unit 64 generates the packet signal including the MAC frame and broadcast-transmits the generated packet signal through the modem unit 54, the RF unit 52, and the antenna 50 at the transmission timing determined by the selecting unit 92 or the carrier sense unit 94. Meanwhile, the transmission timing is included in the inter-vehicle transmission period.

The notifying unit 70 obtains the packet signal from the base station apparatus 10 not illustrated in the road-to-vehicle transmission period and obtains the packet signal from another terminal apparatus 14 not illustrated in the inter-vehicle transmission period. The notifying unit 70 notifies the driver of the approach and the like of another vehicle 12 not illustrated by means of a monitor and a speaker according to the contents of the data stored in the packet signal as a process for the obtained packet signal.

As described above, the extracting unit 66 specifies whether the terminal apparatus is present in the first area 210, in the second area 212, or on the outside of the second area 214. Herein, it may be said that the first area 210, the second area 212, and the outside of the second area 214 are the areas having different priorities. In a case of the second arrangement, the first area 210 corresponds to the priority area and the second area 212 corresponds to the general area, so that the priority of the first area 210 is the highest, the priority of the second area 212 is the second highest, and the priority of the outside of the second area 214 is low. In this case, it may be said that the priority of each area is defined according to importance of the signal, which should be notified. On the other hand, in a case of the first arrangement, the first area 210 corresponds to the general area and the second area 212 corresponds to the priority area, so that the priority of the second area 212 is the highest, the priority of the first area 210 is the second highest, and the priority of the outside of the second area 214 is low.

Also, it may be said that the priority of the first area 210 and that of the second area 212 are determined according to the quality of the received signal. In the case of the second arrangement, the priority of the first area 210 in which reception quality is high is higher than that of the second area 212 in which the reception quality is low. In the case of the first arrangement, the priority of the second area 212 in which the reception quality is low is higher than that of the first area 210 in which the reception quality is high. Further, it may be said that the priority of the first area 210 and that of the second area 212 are determined according to a distance from the base station apparatus 10. In the case of the second arrangement, the priority of the first area 210 having a short distance is higher than that of the second area 212 having a long distance. In the case of the first arrangement, the priority of the second area 212 having the long distance is higher than that of the first area 210 having the short distance.

The extracting unit 66 detects movement to a different area by monitoring the area in which the terminal apparatus is present. For example, this is the movement from the priority area to the general area. The movement in an opposite direction is also possible. Further, the movement between the second area 212 and the outside of the second area 214 such as between the general area and the outside of the second area 214 and between the priority area and the outside of the second area 214 is also possible. The extracting unit 66 changes the instruction to the selecting unit 92 and the carrier sense unit 94 when this detects the movement. For example, when the extracting unit 66 detects the movement from the priority area to the general area, this changes a communication process defined in the priority area to the communication process defined in the general area. Specifically, the instruction to the selecting unit 92 is changed to the instruction to the carrier sense unit 94.

When the extracting unit 66 detects the movement between the second area 212 and the outside of the second area 214, this changes the communication process between the communication process in the second area 212 and the communication process on the outside of the second area 214. The communication process in the second area 212 is the usage of the priority period by the selecting unit 92 and the usage of the general period by the carrier sense unit 94. They are operations constrained by the frame configuration, so that it may be said that they are the operations according to operation timing of the base station apparatus 10. On the other hand, the communication process on the outside of the second area 214 is the operation, which does not depend on the frame configuration, by the carrier sense unit 94. It may be said that this is the operation, which is not related to the operation timing of the base station apparatus 10. The extracting unit 66 notifies the notifying unit 70 of the area in which the terminal apparatus is present, thereby notifying the notifying unit 70 that the area changed.

The notifying unit 70 notifies the driver of the area in which the terminal apparatus is present based on the information of the area received from the extracting unit 66. For example, when the terminal apparatus is present in the priority area, the notifying unit 70 displays its own vehicle in a navigation system in red. When the terminal apparatus is present in the general area, the notifying unit 70 displays its own vehicle in the navigation system in yellow. When the terminal apparatus is present on the outside of the second area 214, the notifying unit 70 displays its own vehicle in the navigation system in blue. In this manner, a display color of its own vehicle is changed according to the area in which the terminal apparatus is present and this corresponds to change in a mode of notification according to the area in which this is present. As a result, the notifying unit 70 notifies that the area changed when the movement is detected. Meanwhile, the notifying unit 70 may output a warning alarm when the terminal apparatus enters the priority area or may output warning by sound. That is to say, it is required that the driver is notified of the entrance in the priority area. The similar process may be performed also in the movement between the second area 212 and the outside of the second area 214. The control unit 58 controls operation of an entire terminal apparatus 14.

Figure 8:
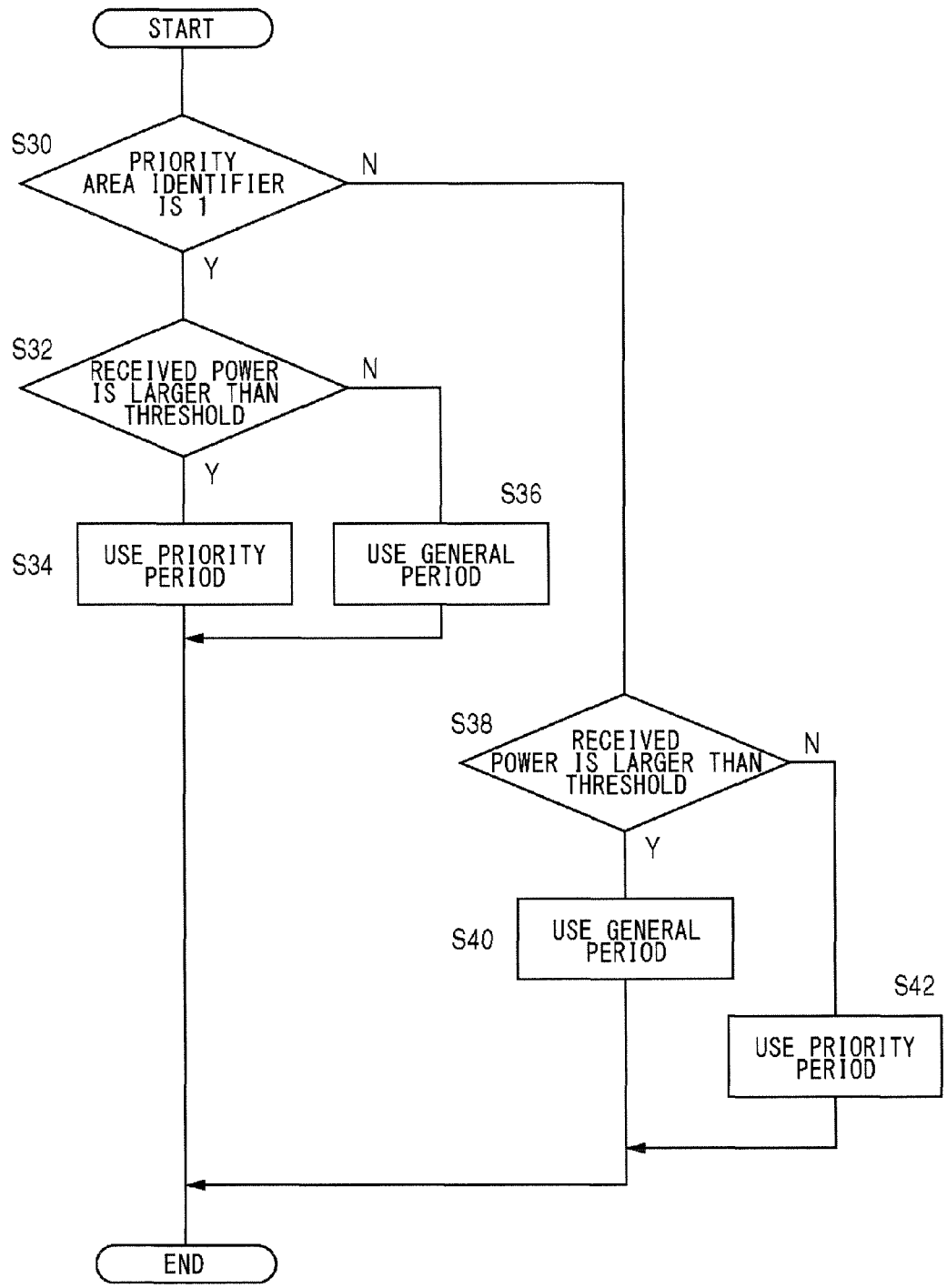
FIG. 8 is a flowchart illustrating a selection procedure of a priority period or a general period in the terminal apparatus in FIG. 7.

Operation of the communication system 100 by the above-described configuration is described. FIG. 8 is a flowchart illustrating a selection procedure of the priority period or the general period in the terminal apparatus 14. When the priority area identifier is "1" (Y at S30) and the received power is larger than the threshold (Y at S32), the extracting unit 66 determines to use the priority period (S34). When the received power is not larger than the threshold (N at S32), the extracting unit 66 determines to use the general period (S36). When the priority area identifier is not "1" (N at S30) and the received power is larger than the threshold (Y at S38), the extracting unit 66 determines to use the general period (S40). When the received power is not larger than the threshold (N at S38), the extracting unit 66 determines to use the priority period (S42).

Figure 9:
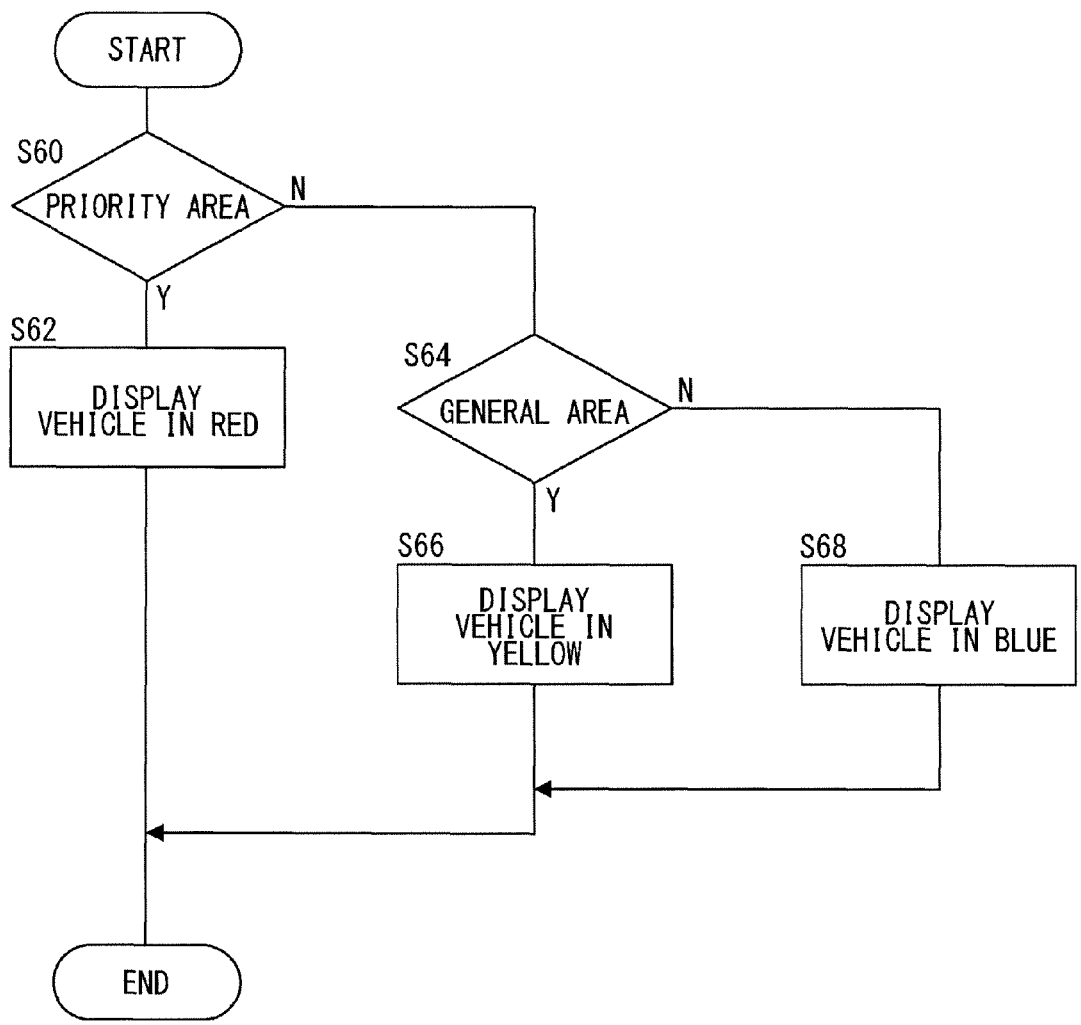
FIG. 9 is a flowchart illustrating a display procedure in the terminal apparatus in FIG. 7.

FIG. 9 is a flowchart illustrating a display procedure in the terminal apparatus 14. When the terminal apparatus is present in the priority area (Y at S60), the notifying unit 70 displays the vehicle 12 in red (S62). On the other hand, when the terminal apparatus is not present in the priority area (N at S60) and is present in the general area (Y at S64), the notifying unit 70 displays the vehicle 12 in yellow (S66). When the terminal apparatus is not present in the general area (N at S64), the notifying unit 70 displays the vehicle 12 in blue (S68).

Next, a modified example of the present invention is described. The modified example of the present invention also relates to the terminal apparatus, which broadcast-transmits the packet signal in which the positional information and the like is stored. In the embodiment, the terminal apparatus is mounted on the vehicle. On the other hand, in the modified example, the terminal apparatus is carried by a user to be moved. Such terminal apparatus is operated by an internal battery, so that it is desired to decrease power consumption thereof. On the other hand, it is required that the terminal apparatus notifies the vehicle of the present position of the user by transmitting the packet signal in order to ensure safety of the user. Further, when the user gets into the vehicle while carrying the terminal apparatus, it is desired that the terminal apparatus operates in the same manner as the terminal apparatus mounted on the vehicle.

In order to respond to this, the terminal apparatus according to the modified example executes only the transmission process of the packet signal and stops the reception process of the packet signal when this is present on the outside of the vehicle. On the other hand, the terminal apparatus executes the transmission process and the reception process of the packet signal when this is present in the vehicle. Herein, the terminal apparatus estimates that this is present on the outside of the vehicle when this operates by the internal battery and estimates that this is present in the vehicle when this operates by an external power supply. The communication system 100 according to the modified example is of the same type as that in FIG. 1 and the base station apparatus 10 is of the same type as that in FIG. 2. Hereinafter, difference is mainly described.

Figure 10:
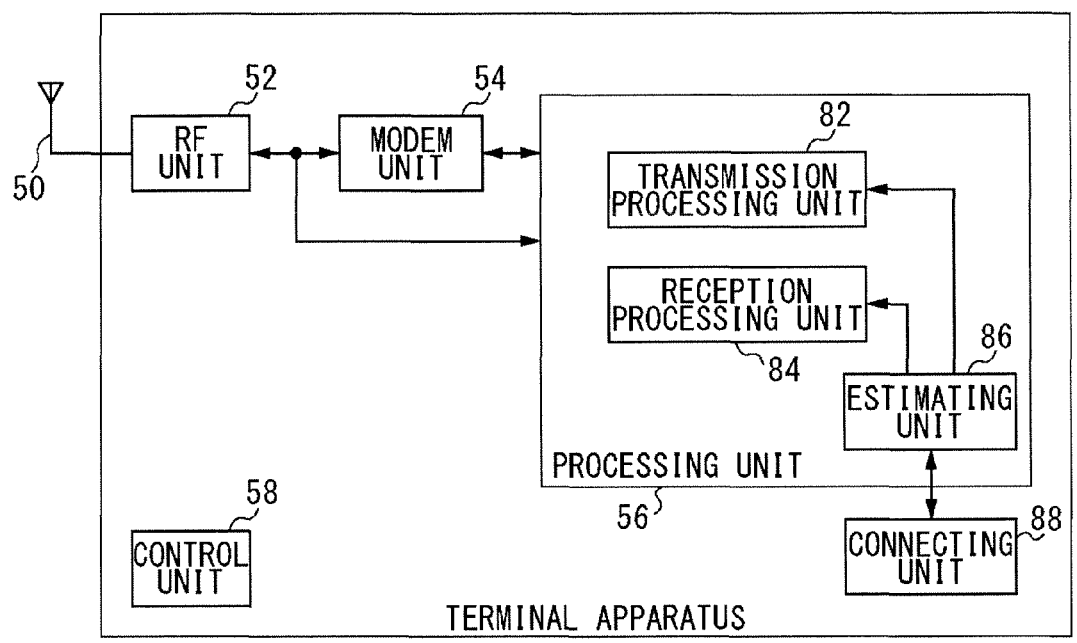
FIG. 10 is a view illustrating a configuration of the terminal apparatus according to a modified example of the present invention.

FIG. 10 illustrates the configuration of the terminal apparatus 14 according to the modified example of the present invention. The terminal apparatus 14 includes the antenna 50, the RF unit 52, the modem unit 54, the processing unit 56, the control unit 58, and a connecting unit 88. The processing unit 56 includes a transmission processing unit 82, a reception processing unit 84, and an estimating unit 86. The antenna 50, the RF unit 52, and the modem unit 54 execute the operations similar to those in FIG. 7, so that the description thereof is not repeated here. Also, the transmission processing unit 82 corresponds to a part to execute a process for broadcasting the packet signal out of the processing unit 56 in FIG. 7 and the reception processing unit 84 corresponds to a part to execute a process for receiving the packet signal out of the processing unit 56 in FIG. 7. Herein, the terminal apparatus 14 is configured so as to be carried by the user as a mobile phone unit, for example.

The connecting unit 88 is connected to a power supply terminal provided on the vehicle 12 not illustrated. The connecting unit 88 is supplied with power from the power supply terminal to drive the terminal apparatus 14. On the other hand, when the terminal apparatus 14 is present on the outside of the vehicle 12, the connecting unit 88 is not connected to the power supply terminal and is not supplied with the power. At that time, the terminal apparatus 14 is driven by the internal battery not illustrated.

The estimating unit 86 detects whether the connecting unit 88 is connected to the power supply terminal. The well-known technology may be used to this detection, so that the description thereof is not repeated here. When the estimating unit 86 detects that the connecting unit is connected to the power supply terminal, this estimates that the terminal apparatus is present in the vehicle 12 and when this detects that the connecting unit is not connected to the power supply terminal, this estimates that the terminal apparatus is present on the outside of the vehicle 12. That is to say, the estimating unit 86 estimates whether the terminal apparatus 14 is present in the vehicle 12 or on the outside of the vehicle 12. When the estimating unit 86 estimates that the terminal apparatus is present in the vehicle 12, this allows the transmission processing unit 82 and the reception processing unit 84 to operate to execute the transmission process and the reception process. On the other hand, when the estimating unit 86 estimates that the terminal apparatus is present on the outside of the vehicle 12, this stops one of the transmission processing unit 82 and the reception processing unit 84 to stop one of the transmission process and the reception process. For example, the estimating unit 86 allows only the transmission processing unit 82 to operate and stops the reception processing unit 84. Meanwhile, an opposite case also is possible.

Figure 11:
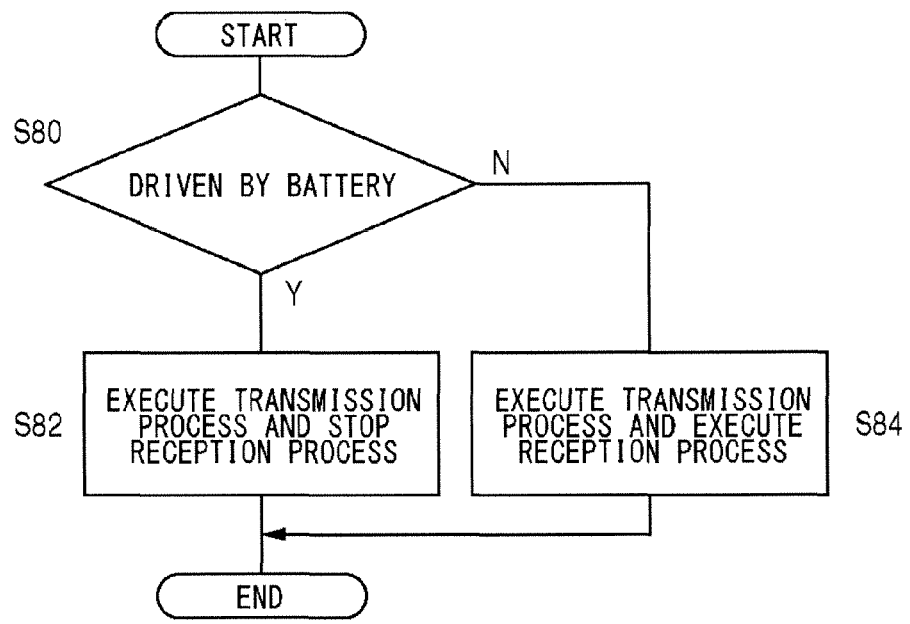
FIG. 11 is a flowchart illustrating a procedure in the terminal apparatus in FIG. 10.

FIG. 11 is a flowchart illustrating a procedure in the terminal apparatus 14. When the terminal apparatus is driven by the battery (Y at S80), the estimating unit 86 executes the transmission process and stops the reception process (S82). On the other hand, when the terminal apparatus is not driven by the battery (N at S80), the estimating unit 86 executes the transmission process and the reception process (S84).

Next, another modified example of the present invention is described. Another modified example of the present invention also relates to the terminal apparatus configured so as to be movable by being carried by the user as in the modified example. Another modified example of the present invention is targeted to a case in which the terminal apparatus is present on the outside of the vehicle. In the modified example, when the terminal apparatus is present on the outside of the vehicle, one of the transmission process and the reception process is stopped in order to decrease the power consumption. On the other hand, there is a case in which it is desired to perform the transmission process and the reception process even when the terminal apparatus is present on the outside of the vehicle. In order to respond to this, the terminal apparatus according to another modified example of the present invention executes the transmission process and the reception process when this approaches the base station apparatus. The communication system 100 according to another modified example is of the same type as that in FIG. 1, the base station apparatus 10 is of the same type as that in FIG. 2, and the terminal apparatus 14 is of the same type as that in FIGS. 7 and 10. Hereinafter, difference is mainly described.

When the extracting unit 66 does not receive the packet signal from the base station apparatus 10, that is to say, when the terminal apparatus is present on the outside of the second area 214 in FIG. 1, the estimating unit 86 stops one of the transmission processing unit 82 and the reception processing unit 84 to stop one of the transmission process and the reception process. On the other hand, when the extracting unit 66 receives the packet signal from the base station apparatus 10, that is to say, when the terminal apparatus is present in the first area 210 and the second area 212 in FIG. 1, the estimating unit 86 allows the transmission processing unit 82 and the reception processing unit 84 to operate to execute the transmission process and the reception process.

Meanwhile, the connecting unit 88 may switch the operation depending on whether the terminal apparatus is present in the first area 210 in place of switching the operation depending on whether the packet signal from the base station apparatus 10 is received. For example, when the terminal apparatus is present in the first area 210, the estimating unit 86 allows the transmission processing unit 82 and the reception processing unit 84 to operate. On the other hand, when the terminal apparatus is present in the second area 212 and on the outside of the second area 214, the estimating unit 86 stops one of the transmission processing unit 82 and the reception processing unit 84.

Figure 12:
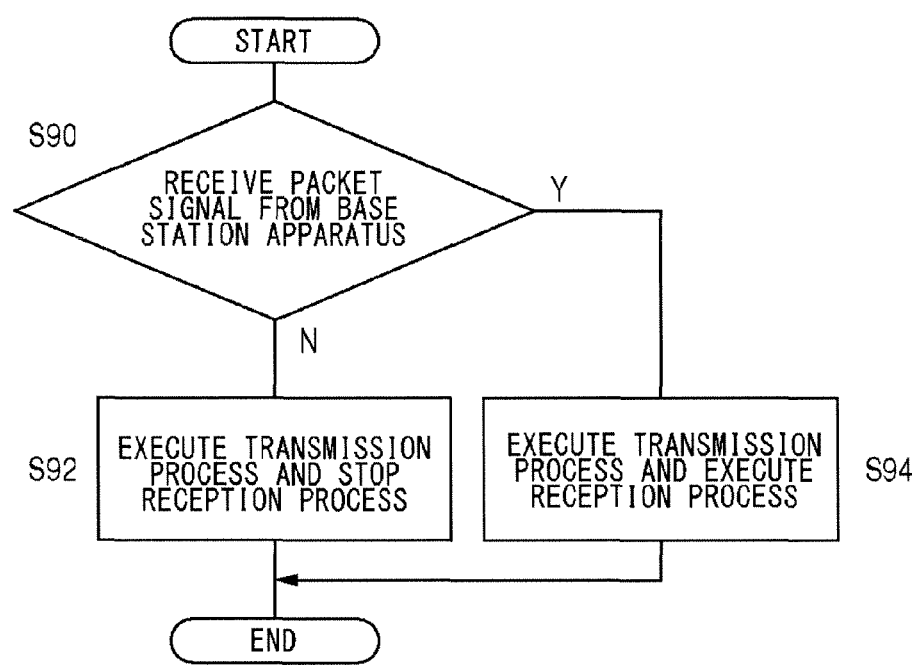
FIG. 12 is a flowchart illustrating the procedure in the terminal apparatus according to another modified example of the present invention.

FIG. 12 is a flowchart illustrating a procedure in the terminal apparatus 14 according to another modified example of the present invention. When the packet signal from the base station apparatus 10 is not received (N at S90), the estimating unit 86 executes the transmission process and stops the reception process (S92). On the other hand, when the packet signal from the base station apparatus 10 is received (Y at S90), the estimating unit 86 executes the transmission process and the reception process (S94).

According to the embodiment of the present invention, the change in the area is notified, so that it is possible to notify the driver of a degree of importance set for the area in which the driver is driving. Also, since the driver is notified of the degree of importance set for the area in which the driver is driving, it is possible to invite the driver's attention. Also, since the driver's attention is invited, it is possible to inhibit probability of occurrence of the collision accident. Also, since the priority of the area is defined according to the degree of importance of the packet signal, which should be broadcasted, it is possible to preferentially transfer the important information. Also, since the priority of the area is defined according to the quality of the received signal, a transfer process according to the quality may be realized. Also, since the priority of the area is defined according to the distance from the base station apparatus, the transfer process according to the distance may be realized. Also, since the mode of notification is changed according to the area, it is possible to allow the driver to correctly recognize the area.

The terminal apparatus present in the first area around the base station apparatus may broadcast the packet signal in the general period and the terminal apparatus present in the second area enclosing the first area may broadcast the packet signal in the priority period, so that it is possible to improve the priority of the communication in the second area. Also, since the priority of the communication in the second area is improved, it is possible to improve reception probability of the packet signal broadcasted by the terminal apparatus present in the second area. Also, since the reception probability of the packet signal broadcasted by the terminal apparatus present in the second area is improved, it is possible to preferentially transfer the important data. Also, since the first arrangement and the second arrangement may be switched, it is possible to switch improvement in the priority of the communication in the first area and improvement in the priority of the communication in the second area. Also, since the improvement in the priority of the communication in the first area from the improvement in the priority of the communication in the second area may be switched, the area, which should have the priority, may be selected according to the intersection. Also, since the selection of the first arrangement or the second arrangement is indicated by the priority area identifier, the process may be made simple.

The received power is used for distinguishing the first area and the second area, so that it is possible to define a range in which propagation loss is within a predetermined degree as the first area. Also, since the range in which the propagation loss is within the predetermined degree is defined as the first area, vicinity of the center of the intersection may be used as the first area. Also, since the time-division multiplexing by the slots is executed in the priority period, the error rate may be decreased. Also, since the CSMA/CA is executed in the general period, it is possible to flexibly adjust the number of terminal apparatuses.

Also, since the subframe used by another base station apparatus is specified not only based on the packet signal directly received from another base station apparatus but also based on the packet signal received from the terminal apparatus, it is possible to improve specifying accuracy of the subframe in use. Also, since the specifying accuracy of the subframe in use is improved, it is possible to decrease the collision probability of the packet signals transmitted from the base station apparatus. Also, since the collision probability of the packet signals transmitted from the base station apparatus is decreased, the terminal apparatus may correctly recognize the control information. Also, since the control information is correctly recognized, it is possible to correctly recognize the road-to-vehicle transmission period. Also, since the road-to-vehicle transmission period is correctly recognized, it is possible to decrease the collision probability of the packet signals.

Also, since other than the subframe in use is preferentially used, it is possible to decrease the possibility that the packet signal is transmitted at the timing overlapped with that of the packet signal from another base station apparatus. Also, since the subframe with the small received power is selected when all the subframes are used by another base station apparatus, it is possible to inhibit an effect of the interference of the packet signal. Also, as the received power from another base station apparatus, which is a source of the control information relayed by the terminal apparatus, the received power of the terminal apparatus is used, so that an estimation process of the received power may be made simple.

Also, since it is estimated whether the terminal apparatus is present in the vehicle depending on whether this is driven by the battery, it is possible to correctly specify a case in which operation with low power consumption is required. Also, when the terminal apparatus is present in the vehicle, the transmission process and the reception process are executed, so that the process similar to that of an in-vehicle terminal apparatus may be executed. Also, when the terminal apparatus is present on the outside of the vehicle, one of the transmission process and the reception process is stopped, so that it is possible to decrease the power consumption. Also, when the terminal apparatus is present on the outside of the vehicle, only the transmission process is executed, so that it is possible to notify of the present position while decreasing the power consumption.

Also, since the present position is notified, it is possible to notify of its presence, thereby ensuring the safety. Also, since the terminal apparatus operates with the low power consumption, it is possible to provide a function of the terminal apparatus on the cell phone unit and the like. Also, since the function of the terminal apparatus is provided on the cell phone unit and the like, it is possible to easily spread the communication system. Also, since the transmission process and the reception process are executed when the terminal apparatus enters a predetermined area even when this is driven by the battery, it is possible to execute the process similar to that of the in-vehicle terminal apparatus as needed. Also, when the terminal apparatus is present on the outside of the area, one of the transmission process and the reception process is stopped, so that it is possible to decrease the power consumption.

The present invention is described above based on the embodiment. The embodiment is illustrative only and one skilled in the art may comprehend that various modifications of combination of the components and the processes are possible and such modifications also fall within the scope of the present invention.

In the modified example and another modified example of the present invention, the estimating unit 86 stops one of the transmission processing unit 82 and the reception processing unit 84 when this estimates that the terminal apparatus is present on the outside of the vehicle 12 or on the outside of the predetermined area. However, this is not limitation and the estimating unit 86 may stop both of the transmission processing unit 82 and the reception processing unit 84 in the above-described case, for example. According to this modified example, it is possible to decrease the power consumption.

What is claimed is:

1. A radio apparatus comprising:
a detector configured to detect movement of the radio apparatus between an inner area and an outer area, the inner area being inside a boundary including intersection and the outer area being outside the boundary; and
a communicating unit configured to perform one of a first communication process for the inner area to transmit a first packet signal, and a second communication process for the outer area to transmit a second packet signal, depending on whether the radio apparatus is within the inner or outer area, the first packet signal being more important than the second packet signal for collision prevention of vehicles, wherein
when the detector detects that the radio apparatus moves from the inner area to the outer area, the detector outputs a signal to notify a user that the radio apparatus has moved to the outer area from the inner area.

2. The radio apparatus according to claim 1, wherein the boundary is defined based on whether a signal from a base station is receivable by the radio apparatus, and when the radio apparatus is within the inner area, the radio apparatus receives a signal from the base station.

3. The radio apparatus according to claim 1, wherein
the communication unit broadcasts the first packet signal of the first communication process during a period defined in a frame for the first communication process, the first packet being for another radio apparatus, and
the communication unit broadcasts the second packet signal of the second communication process, irrespective of the period defined in the frame for the first communication process, the second packet is being for another radio apparatus.

4. The radio apparatus according to claim 3, wherein the communication unit is configured to transmit the first and second packet signals to another radio apparatus under CSMA/CA (carrier sense multiple access with collision avoidance).

5. The radio apparatus according to claim 1, wherein the first packet signal and the second packet signal have the same format as each other.

6. The radio apparatus according to claim 1, further comprising a user interface configured to notify the user that the radio apparatus has moved to the outer area from the inner area.

7. The radio apparatus according to claim 6, wherein the interface has a first notice for notifying the user that the radio apparatus is in the inner area, and a second notice for notifying the user differently from the first notice that the radio apparatus is in the outer area.

8. The radio apparatus according to claim 1, wherein whether the first packet signal is more important than the second packet signal for collision prevention of vehicles is recognized by another radio apparatus which is in the inner area and receives the first packet signal.

9. A radio apparatus comprising:
a detector configured to detect movement of the radio apparatus between an inner area and an outer area, the inner area being inside a boundary including intersection and the outer area being outside the boundary; and
a communicating unit configured to perform one of a first communication process for the inner area to transmit a first packet signal, and a second communication process for the outer area to transmit a second packet signal, depending on whether the radio apparatus is within the inner or outer area, the first packet signal being more important than the second packet signal for collision prevention of vehicles, wherein
when the detector detects that the radio apparatus moves from the outer area to the inner area, the detector outputs a signal to notify a user that the radio apparatus has moved to the inner area from the outer area.

10. The radio apparatus according to claim 9, wherein the boundary is defined based on whether a signal from a base station is receivable by the radio apparatus, and when the radio apparatus is within the inner area, the radio apparatus receives a signal from the base station.

11. The radio apparatus according to claim 9, wherein
the communication unit broadcasts the first packet signal of the first communication process during a period defined in a frame for the first communication process, the first packet being for another radio apparatus, and
the communication unit broadcasts the second packet signal of the second communication process, irrespective of the period defined in the frame for the first communication process, the second packet is being for another radio apparatus.

12. The radio apparatus according to claim 11, wherein the first packet signal and the second packet signal have the same format as each other.

13. The radio apparatus according to claim 9, wherein the communication unit is configured to transmit the first and second packet signals to another radio apparatus under CSMA/CA (carrier sense multiple access with collision avoidance).

14. The radio apparatus according to claim 9, further comprising a user interface configured to notify the user that the radio apparatus has moved to the inner area from the outer area.

15. The radio apparatus according to claim 14, wherein the interface has a first notice for notifying the user that the radio apparatus is in the inner area, and a second notice for notifying the user differently from the first notice that the radio apparatus is in the outer area.

16. The radio apparatus according to claim 9, wherein whether the first packet signal is more important than the second packet signal for collision prevention of vehicles is recognized by another radio apparatus which is in the inner area and receives the first packet signal.

\* \* \* \* \*